United States Patent
Pineda Amo (10) Patent No.: US 12,152,565 B2
(45) Date of Patent: Nov. 26, 2024

(54) VIBRATIONS IN WIND TURBINES

(71) Applicant: General Electric Renovables Espana, S.L., Barcelona (ES)

(72) Inventor: Isaac Pineda Amo, La Garriga (ES)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 18/176,608

(22) Filed: Mar. 1, 2023

(65) Prior Publication Data

US 2023/0304472 A1 Sep. 28, 2023

(30) Foreign Application Priority Data

Mar. 22, 2022 (EP) .................................... 22382189

(51) Int. Cl.
F03D 7/02 (2006.01)

(52) U.S. Cl.
CPC ........ F03D 7/0296 (2013.01); *F05B 2260/96* (2013.01); *F05B 2270/334* (2013.01)

(58) Field of Classification Search
CPC ................ F03D 7/0296; F05B 2260/96; F05B 2270/334
See application file for complete search history.

(56) References Cited

U.S. PATENT DOCUMENTS

| | | | |
|---|---|---|---|
| 7,854,589 B2 | 12/2010 | Nielsen et al. | |
| 8,057,158 B2 | 11/2011 | Seidel et al. | |
| 8,070,437 B2 | 12/2011 | Nielsen et al. | |
| 8,277,185 B2 | 10/2012 | Menke | |
| 8,506,249 B2 | 8/2013 | Egedal | |
| 8,749,084 B2 | 6/2014 | Gjerlov et al. | |
| 8,779,617 B2 | 7/2014 | Egedal et al. | |
| 8,820,149 B2 | 9/2014 | Becker | |
| 9,032,807 B2 | 5/2015 | Olesen | |
| 9,261,080 B2 | 2/2016 | Egedal et al. | |
| 9,316,206 B2 | 4/2016 | Laurberg | |
| 9,453,499 B2 | 9/2016 | Demtroder | |
| 9,683,551 B2 | 6/2017 | Andersen et al. | |
| 9,926,910 B2 | 3/2018 | Chacon et al. | |

(Continued)

FOREIGN PATENT DOCUMENTS

| | | |
|---|---|---|
| EP | 2463517 A1 | 6/2012 |
| EP | 2535567 A2 | 12/2012 |

(Continued)

OTHER PUBLICATIONS

European Patent Search Report Corresponding to EP22382189 on Aug. 18, 2022.

*Primary Examiner* — J. Todd Newton
*Assistant Examiner* — Aye S Htay
(74) *Attorney, Agent, or Firm* — Dority & Manning, P.A.

(57) ABSTRACT

The present disclosure relates to wind turbines comprising a rotor 18 including one or more blades 20, a control module 110 configured to operate the wind turbine according to a first operational setpoint, determine an adjusted setpoint for the wind turbine at least partially based on vibrations in blades and transition to the adjusted setpoint. Further, the control module 110 is also configured to determine remaining vibrations in blades and determine a new setpoint for the wind turbine based on the remaining vibrations. The present disclosure further relates to methods for operating a wind turbine.

14 Claims, 6 Drawing Sheets

(56) References Cited

U.S. PATENT DOCUMENTS

| | | |
|---|---|---|
| 10,145,360 B2 | 12/2018 | Kramer |
| 10,233,907 B2 | 3/2019 | Asheim et al. |
| 10,502,186 B2 | 12/2019 | Kruger et al. |
| 11,092,135 B2 | 8/2021 | Caponetti et al. |
| 11,136,962 B2 | 10/2021 | Pedersen |
| 11,384,731 B2 | 7/2022 | Bachmann et al. |
| 2012/0133134 A1* | 5/2012 | Scholte-Wassnik ........... F03D 7/0296 290/44 |
| 2013/0156577 A1* | 6/2013 | Esbensen ............... F03D 7/048 416/37 |
| 2019/0368465 A1* | 12/2019 | Mandrioli ............. F03D 7/0272 |
| 2020/0072192 A1 | 3/2020 | Meli Tiwa et al. |
| 2020/0132052 A1 | 4/2020 | Schmid et al. |
| 2020/0248666 A1 | 8/2020 | Lee |
| 2020/0263664 A1* | 8/2020 | Bachmann ............. F03D 7/042 |
| 2020/0263666 A1* | 8/2020 | Pedersen ............. F03D 7/0224 |
| 2020/0332765 A1* | 10/2020 | Dalsgaard ............... F03D 7/028 |
| 2021/0207583 A1 | 7/2021 | Dalsgaard et al. |
| 2021/0231102 A1* | 7/2021 | Thomsen ............. F03D 7/0296 |
| 2022/0220936 A1 | 7/2022 | Thomsen et al. |
| 2022/0220937 A1 | 7/2022 | Thomsen et al. |

FOREIGN PATENT DOCUMENTS

| | | |
|---|---|---|
| EP | 3067557 A1 | 9/2016 |
| EP | 3707375 A1 | 9/2020 |
| EP | 3384154 B1 | 10/2020 |
| WO | WO2018019345 A1 | 2/2018 |
| WO | WO2018105969 A1 | 6/2018 |
| WO | WO2018114923 A1 | 6/2018 |
| WO | WO2019012083 A1 | 1/2019 |
| WO | WO2019219138 A1 | 11/2019 |
| WO | WO2020238693 A1 | 12/2020 |
| WO | WO2020239177 A1 | 12/2020 |
| WO | WO2020239178 A1 | 12/2020 |

\* cited by examiner

VIBRATIONS IN WIND TURBINES

The present disclosure relates to wind turbines, and to methods for operating wind turbines. The present disclosure more particularly relates to methods and systems for controlling vibrations in wind turbines.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly or through a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that contains and protects e.g. the gearbox (if present) and the generator and, depending on the wind turbine, further components such as a power converter, and auxiliary systems.

In variable speed wind turbines, a wind turbine controller can change control settings of the wind turbine to adapt to varying wind conditions. In particular, pitch angles of the blades and generator torque may be varied to adapt to the wind conditions. At wind speeds below the nominal or "rated" wind speed, the control objective is generally to maximize electrical power output of the wind turbine i.e. pitch and generator torque are varied such that maximum electrical power output can be delivered to the grid. Above the nominal wind speed (and depending on the circumstances around the nominal wind speed), the control objective may be particularly to keep loads under control, i.e. pitch and generator torque are varied to reduce the loads on the wind turbine to acceptable loads levels, while the power output is maintained at the highest possible level (given the constraints on the loads).

Further, modern wind turbines have increasingly larger rotor diameters to capture more energy throughout their lifetime and reduce the cost of energy. As the rotor size increases, the stiffness of the blades is not proportionally increased, leading to more flexible blades that are more sensitive to dynamic perturbations. Said dynamic perturbations may lead to vibrations including spanwise and edgewise vibrations. Edgewise vibrations are generally associated with insignificant aerodynamic damping and therefore may lead to large dynamic responses. Thus, the mitigation of edgewise vibrations is of particular importance when the fatigue life of a wind turbine blade is to be extended.

Different methods are known for vibration mitigation, such as fixed power derating or fixed speed reduction when a specific level of vibrations are detected, or fixed exclusion zones (in the rotor velocity domain) to avoid wind turbine operation in potential resonance scenarios. However, the known approaches generally result in a considerable loss in Annual Energy Production (AEP).

SUMMARY

In an aspect of the present disclosure, a wind turbine is provided. The wind turbine comprises a rotor including one or more blades and a control module. The control module of the wind turbine is configured to receive signals from one or more sensors and to determine vibrations in the blades. Further, the control module is configured to select a wind turbine operation setpoint at least partially based on the determined vibrations, and to operate the wind turbine according to the selected operation setpoint. Additionally, the control module is configured to continue determining vibrations after selecting the wind turbine operation setpoint, so that a new operation setpoint can be selected accordingly.

According to this aspect, the wind turbine provided allows adjusting the selected operation setpoint based on the determined vibrations, and more precisely on the evolution of the vibrations. This means that the required variation in the operation setpoint due to the rise of vibrations can be identified more precisely, reducing the potential risk of wind turbine failures due to excessive loads and also mitigating the detrimental effects of vibration in the power production. More precisely, the control module can select a wind turbine operation setpoint at least partially based on the vibrations, and then, depending on the evolution of the same, the control module can adjust the operation setpoint to a higher power operation level or to a lower power operation level.

In a further aspect, a method for operating a wind turbine is disclosed. The method comprises operating the wind turbine according to a first operational setpoint. Further, the method comprises determining an adjusted setpoint at least partially based on vibrations in blades. Then, the method further comprises transitioning the wind turbine to the adjusted setpoint and determining remaining vibrations in blades after starting the transitioning to the adjusted setpoint. Further, the method also comprises determining a new setpoint at least partially based on the remaining vibrations, wherein the new setpoint is different from the first operational setpoint and from the adjusted setpoint.

With a method according to this aspect, the wind turbine operation setpoint can be actively adapted as a function of the evolution of the vibrations. Thus, by determining vibrations in blades, the method can react without excessively derating the wind turbine operation or derating the wind turbine operation during an unnecessarily long period of time. Further, the present method may allow identifying an erroneous determination of the wind turbine operation setpoint and correct it according to the remaining vibrations in blades.

DETAILED DESCRIPTION OF EXAMPLES

Reference now will be made in detail to embodiments of the present disclosure, one or more examples of which are illustrated in the drawings. Each example is provided by way of explanation only, not as a limitation. In fact, it will be apparent to those skilled in the art that various modifications and variations can be made in the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Figure 1:
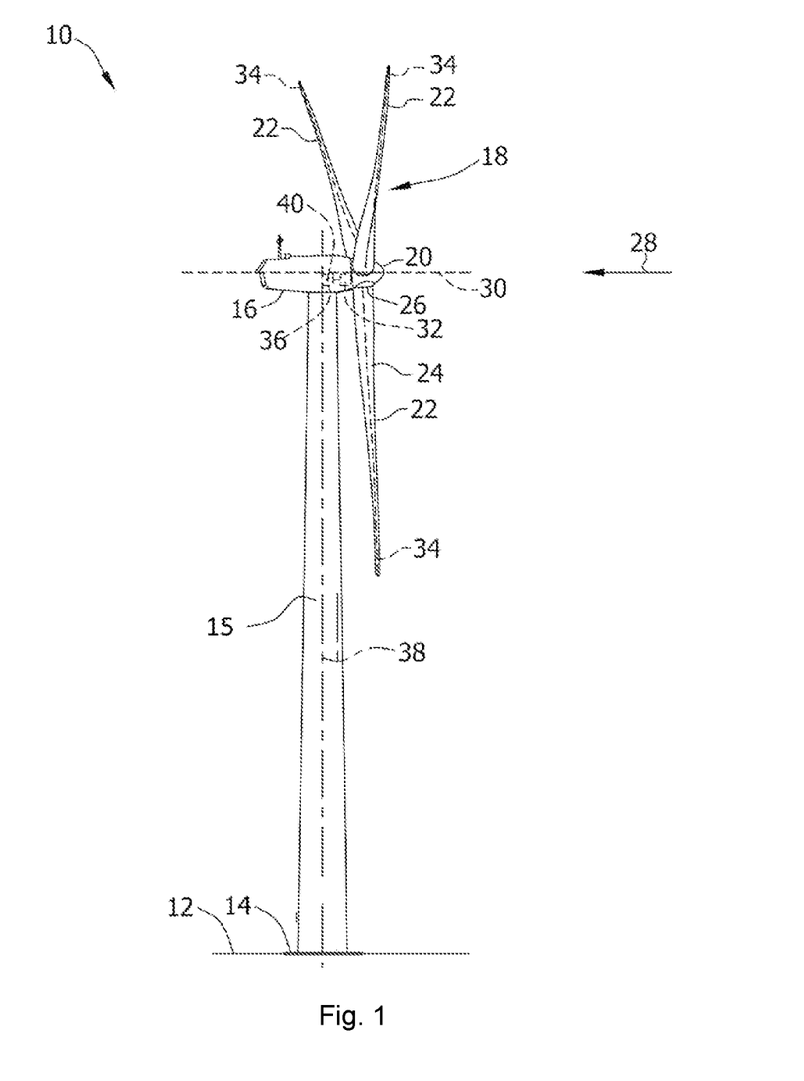
FIG. 1 schematically illustrates a perspective view of one example of a wind turbine.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
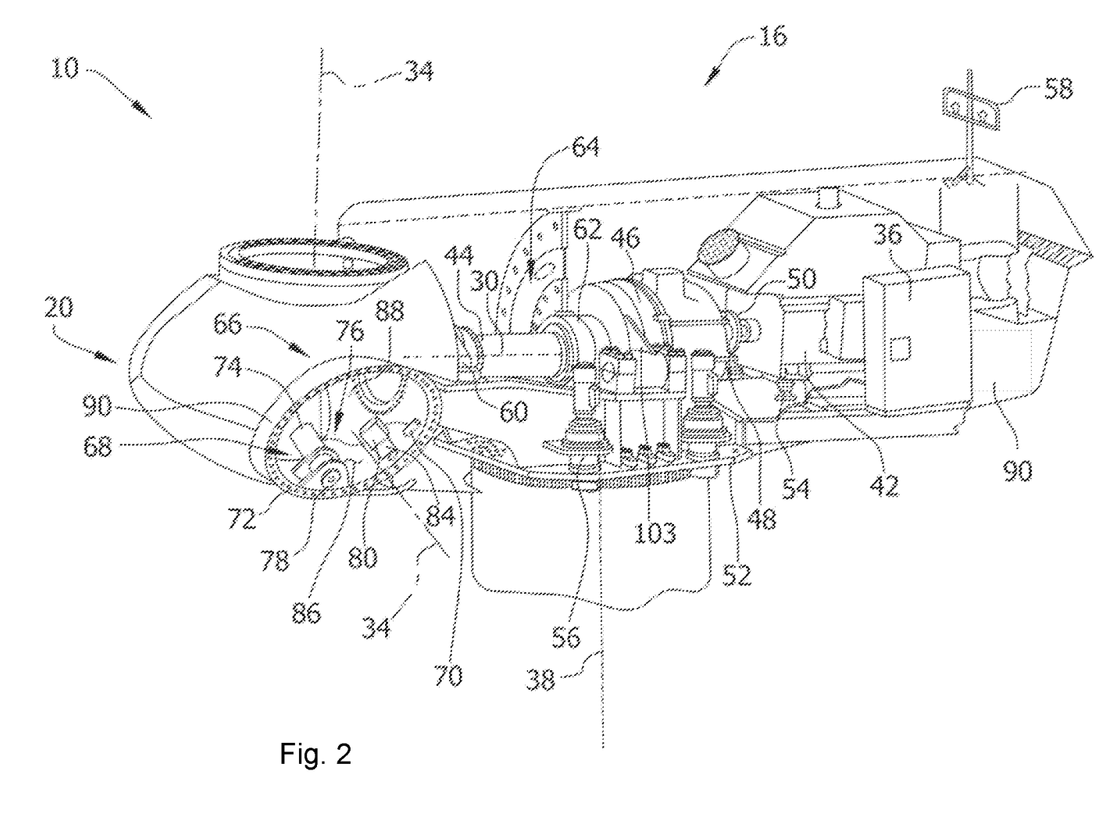
FIG. 2 illustrates a simplified, internal view of one example of the nacelle of the wind turbine of FIG. 1.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage of e.g. 400V to 1000 V into electrical energy having medium voltage (e.g. 10-35 KV). Offshore wind turbines may have for example generator voltages between 650 V and 3500 V, and transformer voltages may for instance be between 30 kV and 70 kV. Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system 58 which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angle of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to the outer surface.

Figure 3:
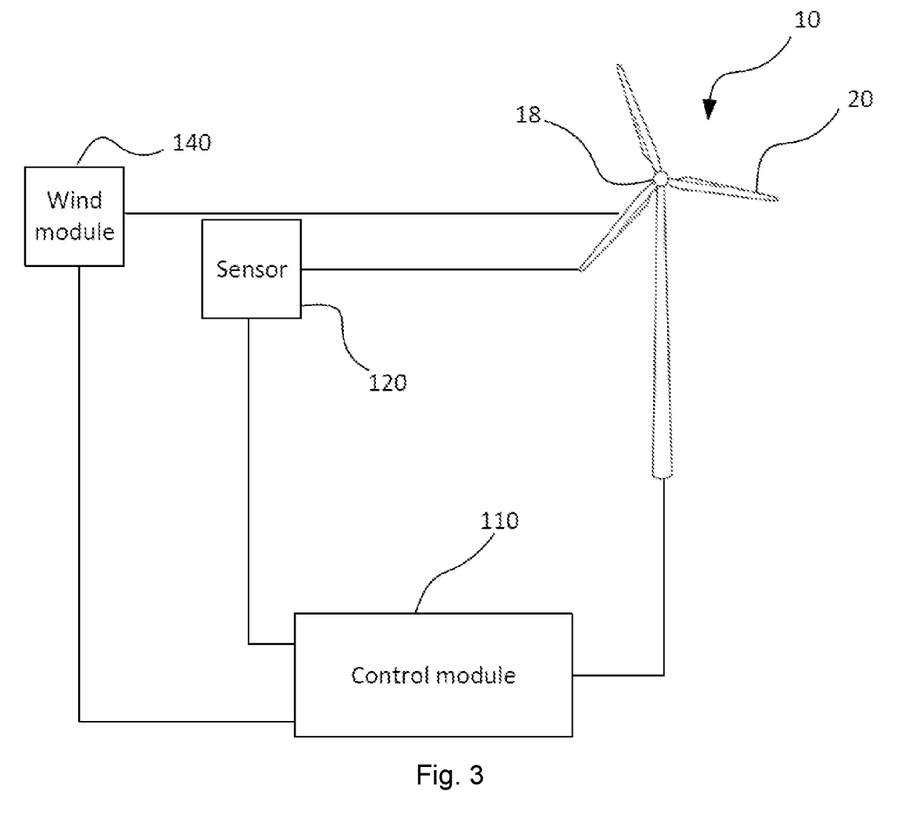
FIG. 3 schematically illustrates an example of a wind turbine according to the present disclosure.

FIG. 3 schematically illustrates a wind turbine 10 according to an example. The wind turbine 10 comprises a rotor 18 including one or more blades 20 and a control module 110. The control module 110 is configured to operate the wind turbine according to a first operational setpoint. Further, the control module 110 is configured to receive signals from one or more sensors 120 and to determine vibrations in the blades 20. Further, the control module 110 is configured to select a wind turbine operation setpoint at least partially based on the determined vibrations. Additionally, the control module 110 is also configured to operate the wind turbine 10 according to the selected operation setpoint. More particularly, the control module 110, is further configured to continue determining vibrations after selecting the wind turbine operation setpoint so that a new operation setpoint different from the first operational setpoint and from the adjusted setpoint can be selected. Therefore, the control module 110 may be understood as a feedback controller that adjusts the operation of the wind turbine 10 at least partially based on how the vibrations evolve. The control module 110 may adjust the operation of the wind turbine 10 at least partially based on how the vibrations evolve during the transition of the wind turbine operation to the selected setpoint and/or once the wind turbine operates at the selected setpoint.

In examples, the control module 110 may adjust the operation of the wind turbine 10 based on the vibrations determined or measured in a single blade 20. In other examples, the control module 110 may use vibration data from several blades 20 to adjust the operation of the wind turbine 10.

The control module 110 may receive signals from already existing wind turbine sensors 120. Further, said signals may be either raw signals or processed signals. The sensors 120 may be accelerometers, strain gauges or others, located at different locations in the blade and/or nacelle. The sensors 120 may provide location information together with the measured signal. Alternatively, the control module 110 may already contain sensor information, such as sensor characteristics, location of the sensors and others. Further, the control module 110 may comprise nacelle sensors and/or blade sensors to acquire corresponding signals. In other examples, the wind turbine control module 110 may receive vibration information through a wired or wireless connection.

In examples, the wind turbine 10 may further comprise a wind module 140 for obtaining wind characteristics. The wind module 140 may comprise any number or type of sensors that may be employed for measuring various wind parameters, such as wind speed, wind peaks, wind turbulence, wind shear, changes in wind direction, air density, temperature, pressure, or similar. For example, the sensors may be pressure sensors, Light Detecting and Ranging (LIDAR) sensors, camera systems, anemometers, wind vanes, Sonic Detection and Ranging (SODAR) sensors, infra lasers, pitot tubes, rawinsondes, other optical sensors, and/or any other suitable sensors. Further, the sensors may be located near the ground of the wind turbine, on the nacelle, or on a meteorological mast of the wind turbine. Alternatively, the wind module 140 may receive the various wind parameters from other sensing modules and treat the data before sending it to the control module 110.

Thus, the wind module 140 may be integrated in the control module 110 or may be a separate component connected to the control module 110. Thus, the control module 110 may select the wind turbine operation setpoint at least partially based on the measured wind characteristics. More precisely, the wind module 140 may acquire data at sufficient rate, i.e. in the kHz range, to determine instantaneous flow quantities of interests, such as turbulence intensity and characteristic scales of the flow, as for example the integral time scale (or integral length scale). The integral time scale in the present disclosure should be understood as a measure of the period of time for which large turbulent scales act over the wind turbine blade, i.e., the period of time for which velocity fluctuations are correlated. Therefore, a wind flow with large integral time scales would mean that individual turbulent eddies will affect the wind turbine blade for longer period of times, whereas small integral time scales represent that individual turbulent eddies have a relatively short time effect on the wind turbine blade.

The control module 110, after receiving these wind characteristics data, may select the wind turbine operation setpoint of the wind turbine at least partially based on the background turbulence characteristics. For example, if the control module 110 determines that the level of turbulence is relatively high, a higher setpoint may be selected than when the level of turbulence is relatively low. If the wind is turbulent, the risk of resonance is lower, because the excitation of the blades will be less constant. Moreover, if a given level of vibration is caused mainly by turbulence, there is less need to react than if the same level of vibration is actually caused by resonance. Therefore, the wind turbine operation setpoint may at least partially depend on wind turbulence level, i.e. wind turbulence intensity.

In some other examples, the control module 110 of the wind turbine 10 may adjust a pitch angle of the blades 20 or a torque of a generator of the wind turbine 10 to bring the wind turbine 10 to the selected operation setpoint. The control module 110 may also combine a pitch angle adjustment with an adjustment of the torque of the generator.

In further examples, and as shown in FIG. 3, the control module 110 may select the wind turbine operation setpoint when the vibrations are above a maximum vibration threshold. The maximum vibration threshold may correspond to vibration level below the operational limit of a component. Thus, the maximum vibration threshold may be 20% below of the operational limit of the wind turbine blade 20. Other differences between the maximum vibration threshold and the operational limit of a component may be employed. An operational limit may be regarded herein as a safety limit i.e. a level of loads that a component can still withstand without the risk of damage or rupture. In other examples, the maximum vibration threshold may also depend on external parameters such as wind characteristics, operational limits of other components, sensor data indicative of component wear or other parameters representative of component lifetime, such as a lifetime estimation parameter or an accumulated damage parameter. The maximum vibration threshold may be set lower than the actual operational limit of the components, e.g. a predetermined amount or predetermined percentage lower than an operational limit of the component. Further, the maximum vibration threshold may comprise at least one of a vibration amplitude and a vibration frequency, e.g. a maximum vibration amplitude as a function of the vibration frequency.

In other examples, the control module 110 of the wind turbine 10 may comprise a signal processing module. The signal processing module may treat the sensor signal following several approaches. For example, the signal processing may filter the sensor signal prior to determining vibrations in the blades. For example, the signal processing module may filter high frequency noise that may not correspond with actual vibrations in the blade 20. A low pass filter might be used for such purposes. Further, the signal processing module may treat both the sensor signal or the determined vibrations and perform modal decomposition. Modal decomposition may herein be regarded as the decomposition of the original vibration signal into a plurality of different vibrations with their own frequency and/or decay rate. This may allow obtaining the most energetic vibration modes acting in the blades 20. This information may be fed into the control module 110 to later select the appropriate wind turbine operation setpoint. Additionally, the signal processing module may compute a power spectrum of the vibrations in the blades 20 to determine how the vibration energy is spread across the frequency domain.

In some examples, adjusting the wind turbine operation setpoint comprises a PID control based on a vibration error. Note that the vibration error may be the difference between the maximum vibration threshold and the determined vibrations. I.e. the predetermined maximum vibration threshold is used as a desired setpoint in the PID control. However, other definitions of the vibration error may be applied.

A proportional—integral—derivative controller (PID controller) is a control loop mechanism employing feedback. A PID controller continuously calculates an error value ("vibration error value" in this example) as the difference between a desired setpoint (in this example, the maximum vibration threshold) and a measured process variable (in this example, the vibrations in the blades) and applies a correction based on proportional, integral, and derivative terms (denoted P, I, and D respectively).

PID control should not be understood herein that necessarily all three terms (proportional, integral and derivative) are used. In examples of the present disclosure, one or two of the terms may have a gains factor of zero, i.e. the PID control may be e.g. a PI control, or a PD control.

Alternatively, the feedback control herein embodied as a PID control may be embodied as any of Model Predictive Control (MPC), H-infinity methods, Linear-Quadratic (LQ) regulator. Further suitable algorithms for feedback control may also be used.

An output of the PID (or other feedback) control may be a wind turbine operation setpoint based on vibrations.

Figure 4:
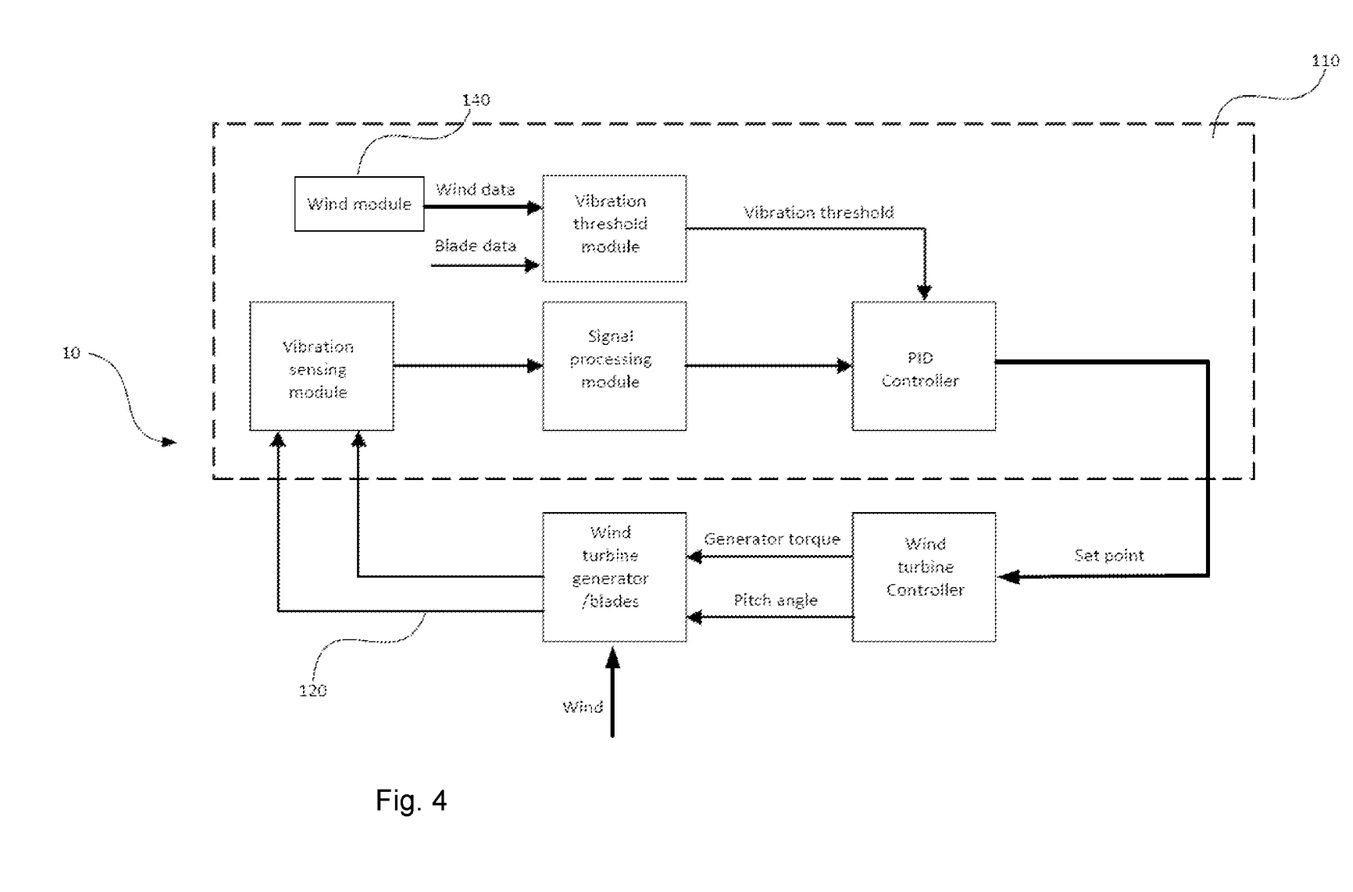
FIG. 4 schematically illustrates a block diagram of another example of a wind turbine according to the present disclosure.

FIG. 4 schematically illustrates a block diagram of a wind turbine 10 according to another example. The wind turbine 10 comprises a wind turbine controller, a wind turbine generator, wind turbine blades and a control module 110. The control module 110 comprises several modules that are configured to perform different tasks. As illustrated, the control module 110 may comprise a wind module 140 configured to measure or estimate local wind characteristics. The data containing wind characteristics may be transferred to a vibration threshold module which, also based on data containing blade characteristics, estimates a vibration threshold. As previously discussed, the vibration threshold may include at least one of a vibration amplitude and a vibration frequency, as for example, a maximum vibration amplitude as a function of a vibration frequency.

In this example, the vibration threshold may be dynamically varied as a function of wind data. I.e. if the wind is very turbulent, a higher acceptable threshold might be defined, whereas if the wind is not turbulent, a lower acceptable threshold might be set. In other examples, a fixed predefined vibration threshold may be used.

Further, the control module 100 may also include a vibration sensing module that receives sensor data at least from one of the blades and the nacelle. The sensing module may combine different sensor data or may treat the data separately, e.g. the sending module may treat a blade load sensor data independently from the others. For example, the flapwise loads or corresponding sensor data may be treated separately and differently from the edgewise loads. Further, the sensing module may treat the sensor data, e.g. raw sensor data, to obtain a signal representative of a vibration in a blade.

Additionally, this signal may be treated further by a signal processing module. The signal processing module may obtain any of the parameters previously discussed, as for example, vibration peaks, root mean square values of the vibrations, vibration envelopes, vibration frequencies, vibration rate of change, power spectrum of the vibration and others. As shown in this example, a PID controller may receive the vibration threshold and a wind turbine vibration signal as input data. Further, the PID controller may compare the two input data and select an operation setpoint for the wind turbine. The PID controller may be configured to select an operation setpoint such that at least one vibration parameter is reduced, e.g. peak amplitude of vibrations, root mean square of vibrations, amplitude of vibrations at a given frequency, or others.

Then, a wind turbine controller may receive the selected operation setpoint and may send commands to at least one of the converter to control the generator torque and the pitch control systems (or pitch drives) to transition to the selected operation setpoint. These commands may include a target torque for the wind turbine generator and a pitch angle for the wind turbine blades. Additionally, while the wind turbine transitions to the selected setpoint and also after transitioning to the selected setpoint, the sensors 120 may continue sending data to the vibration sensing module. The vibration sensing module may keep feeding the signal processing module and this the PID controller. Doing so, the PID controller can adjust the setpoint according to remaining vibrations or to the evolution of vibrations. At the same time, the wind module 140 may also keep sending data containing wind characteristics to the vibration threshold module and this may adapt the vibration threshold that is transmitted to the PID controller.

A closed vibration control loop is thus provided in this example. As opposed to prior art solutions wherein a vibration is not acted upon until it reaches a threshold and/or wherein a vibration is assumed to be resolved after taking a possibly excessive countermeasure, examples of the present disclosure provide continuous monitoring of the level of vibrations and can provide higher setpoints as long as the vibrations and corresponding loads are at an acceptable level.

Figure 5:
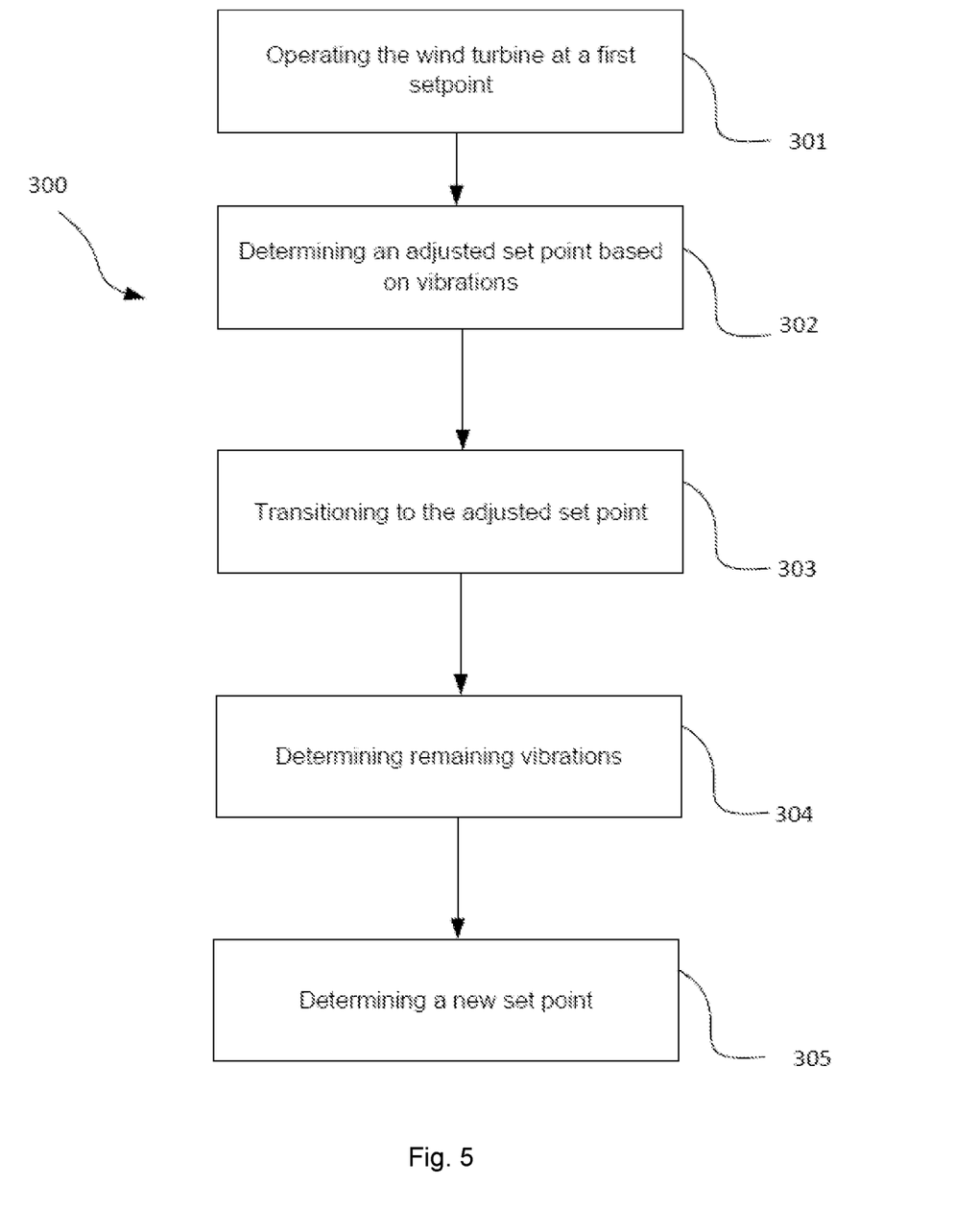
FIG. 5 illustrates an example of a method for controlling edgewise vibrations in wind turbine blades.

FIG. 5 is a flow diagram of an example of a method 300 for operating a wind turbine 10. The method 300 comprises, at block 301, operating the wind turbine according to a first operational setpoint. At block 302, the method 300 comprises determining an adjusted setpoint at least partially based on vibrations in blades 20 of the wind turbine 10. Further, at block 303, the method 300 comprises transitioning the wind turbine to the adjusted setpoint. Besides, at block 304, the method includes determining remaining vibrations in blades 20 after starting the transitioning 303 to the adjusted setpoint. Additionally, the method comprises at block 305 determining a new setpoint based on the remaining vibrations, wherein the new setpoint is different from the first operational setpoint and from the adjusted setpoint. Note that the new setpoint may be higher or lower that then setpoint determined at block 302. For example, the new setpoint may be higher than the adjusted setpoint in spite of having remaining vibrations in the blade 20. This may occur if it is expected that the remaining vibrations will decay over time, i.e. if the evolution of the remaining vibrations shows a descending trend.

Additionally, determining a new setpoint for the wind turbine may be carried out in a closed loop control process. The close loop control process may include a process variable and a control objective, wherein the edgewise vibrations in the wind turbine blade may be the process variable, and the control objective may be the maximum vibration threshold As previously discussed for the wind turbine 10, determining 304 remaining vibrations in blades 20 after starting the transitioning 303 to the adjusted setpoint allows to mitigate power deratings and maximizes power output (for a given load limitation). Determining 304 remaining vibrations may be performed at discrete time intervals, i.e. periodically with constant or variable time difference between instances, after starting the transitioning 303 or in a continuous manner, i.e. with relatively high sampling. This may allow determining 305 new setpoints accordingly.

In some examples, the determining step at block 302 takes place when vibrations are above a maximum vibration threshold. As previously discussed, this might depend on several parameters, e.g. it may occur at different vibration amplitudes as a function of vibration frequency; and may also depend on other internal parameters such as blade geometry, or external parameters such as wind characteristics.

Besides, in other examples, the method 300 may comprise obtaining wind characteristics and determining 302 an adjusted setpoint at least partially based on said wind characteristics. Additionally, transitioning to the wind turbine adjusted setpoint, in block 303, may comprise using a PID controller for which vibrations in the blades 20 are a process variable. In further examples, transitioning 303 to the adjusted operation setpoint is achieved by adjusting pitch angles of the blades 20 or a torque of a generator of the wind turbine 10 in response to the vibrations, e.g. the remaining vibrations in blades 20 after starting the transitioning 303.

In other examples, determining vibrations in the blades 20, in block 302, may comprise filtering a vibration signal.

Said vibration signal may come from one or more sensors located in the blades 20 and/or nacelle of the wind turbine 10.

In additional examples, the first operational setpoint at block 301 may be a steady state operational setpoint. I.e. an operational setpoint that corresponds to a point in the power curve that maximizes power output.

Figure 6:
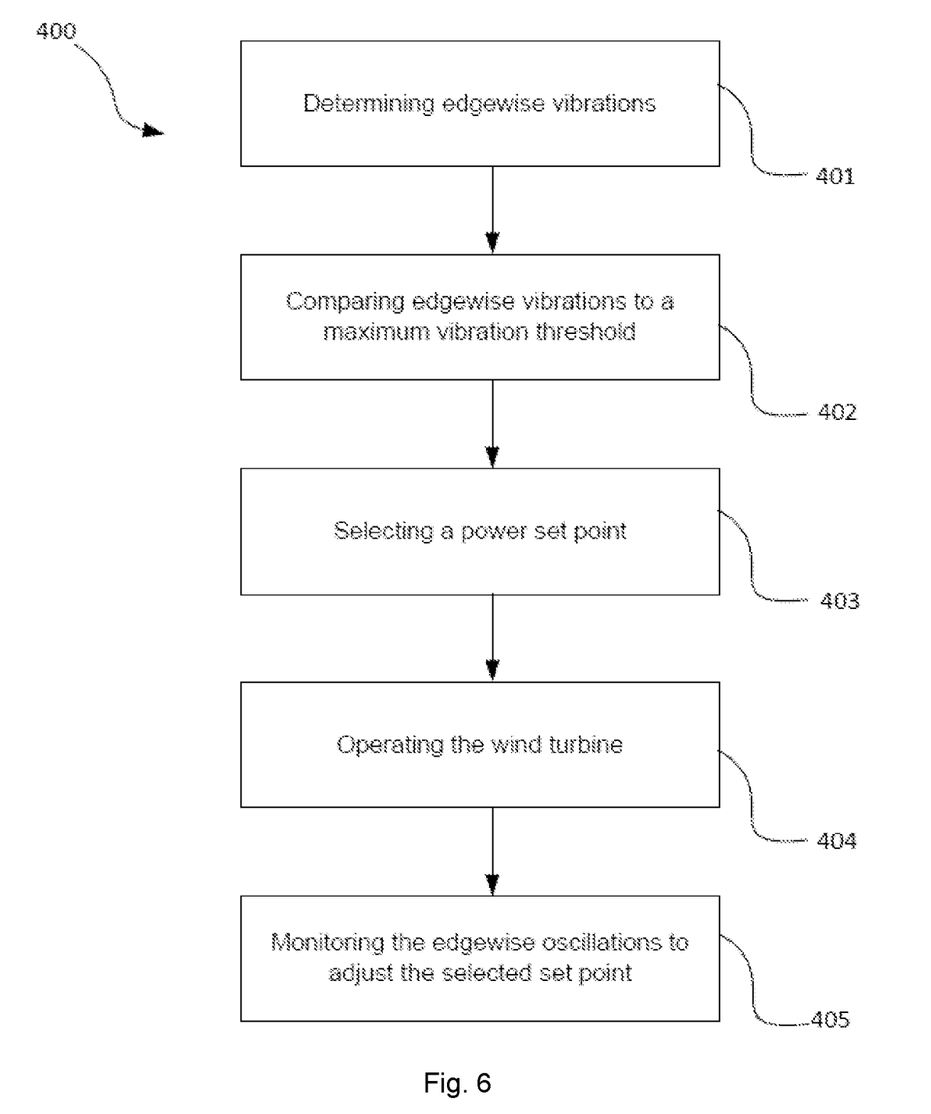
FIG. 6 illustrates an example of another method for operating a wind turbine.

Another method for operating a wind turbine 10 is schematically illustrated in FIG. 6. The method 400 comprises, at block 401, determining edgewise vibrations in a wind turbine blade 20. Determining edgewise vibrations may comprise directly measuring edgewise vibrations (and/or edgewise loads), or measuring oscillations (or loads) in other or multiple directions and deriving the edgewise vibrations from these measurements.

Further, at block 402, the method 400 comprises comparing the determined edgewise vibrations to a maximum vibration threshold. Then the method 400 also comprises selecting 403 a power setpoint for the wind turbine 10 in a closed loop control process including a process variable and a control objective, wherein the edgewise vibrations in the wind turbine blade is the process variable, and the control objective is the maximum vibration threshold. Further, method 400 comprises operating 404 the wind turbine 10 according to the selected power setpoint, and monitoring 405 the edgewise vibrations while operating 404 the wind turbine 10 to adjust the power setpoint accordingly.

In examples, the method 400 comprises using a PID controller for operating 404 the wind turbine 10, where the PID controller uses the edgewise vibrations in the wind turbine blade 20 as the process variable, and wherein the maximum vibration threshold is the desired setpoint. Thus, the PID controller may modify the power setpoint selected in block 403 according to the evolution of the edgewise vibrations during the wind turbine operation 404. As mentioned in other examples, other closed loop control mechanisms incorporating feedback after a corrective action has been taken may be used as well.

In other examples, operating 404 the wind turbine 10 may comprise adjusting pitch angles of the blades 20 or a torque of a generator of the wind turbine 10 in response to the monitored edgewise vibrations.

Note that any of the technical features disclosed in relation with the examples of the wind turbine 10 disclosed may be adopted in the methods 300, 400 and vice versa. Further, those of skill in the art would appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application.

The various illustrative logical blocks, modules, and circuits described in connection with the disclosure herein may be implemented or performed with one or more general-purpose processors, a digital signal processor (DSP), cloud computing architecture, an application specific integrated circuit (ASIC), a field programmable gate array (FPGA), programmable logic controller (PLC) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The present disclosure also related to computing systems adapted to carry out any of the methods disclosed herein.

The present disclosure also relates to a computer program or computer program product comprising instructions (code), which when executed, performs any of the methods disclosed herein.

The computer program may be in the form of source code, object code, a code intermediate source and object code such as in partially compiled form, or in any other form suitable for use in the implementation of the processes. The carrier may be any entity or device capable of carrying the computer program.

If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

This written description uses examples to disclose the present teaching, including the preferred embodiments, and also to enable any person skilled in the art to practice it, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method for operating a wind turbine, comprising:
operating the wind turbine according to a first operational setpoint to produce power at a first power level;
detecting vibrations induced in blades of the wind turbine at the first power level;
determining an adjusted setpoint for the wind turbine to operate at an adjusted power level that is different from the first power level based on the vibrations in the blades;
transitioning operation of the wind turbine to the adjusted setpoint;
evaluating transition vibrations in the blades during the transitioning operation of the wind turbine to the adjusted setpoint and evaluating remaining vibrations in the blades at the adjusted setpoint;
determining a new setpoint for the wind turbine to operate at a new power level based on the evaluation of the transition and remaining vibrations, wherein the new setpoint is different from the adjusted setpoint and is higher than the adjusted setpoint when the evaluation of the transition and remaining vibrations indicates that the remaining vibrations are decaying; and
wherein the adjusted setpoint is determined when the vibrations are above a maximum vibration threshold such that the wind turbine continues to operate at the first power level when the vibrations are greater than zero and below the maximum vibration threshold.

2. The method for operating a wind turbine according to claim 1, wherein the first operational setpoint is a steady state operational setpoint at the first power level.

3. The method for operating a wind turbine according to claim 1, wherein determining the remaining vibrations and determining the new setpoint are performed continuously.

4. The method for operating a wind turbine according to claim 1, wherein the method further comprises: obtaining wind characteristics; and changing the adjusted setpoint based on the obtained wind characteristics.

5. The method for operating a wind turbine according to claim 1, wherein determining the adjusted setpoint and the new setpoint comprises using a PID controller in which the vibrations in blades are a process variable.

6. The method for operating a wind turbine according to claim 1, wherein transitioning to the adjusted setpoint is performed by at least one of adjusting pitch angles of the blades or a torque of a generator of the wind turbine in response to the vibrations in the blades.

7. A wind turbine comprising:
a rotor including one or more blades; and
a control module configured to carry out the method according to claim 1.

8. The wind turbine according to claim 7, further comprising a wind module for obtaining wind characteristics, and wherein the control module is configured to select the adjusted setpoint at least partially based on the obtained wind characteristics.

9. The wind turbine according to claim 7, wherein the control module is configured to adjust a pitch angle of the blades or a torque of a generator of the wind turbine in response to the vibrations in the blades.

10. The wind turbine according to claim 7, wherein the control module is configured to select the adjusted setpoint when the vibrations are above a maximum vibration threshold.

11. The wind turbine according to claim 10, wherein the maximum vibration threshold comprises one or both of a vibration amplitude and a vibration frequency.

12. The wind turbine according to claim 7, wherein the control module is configured to select the adjusted setpoint based at least partially on a geometry of the blades or on wind turbulence.

13. The wind turbine according to claim 7, wherein the control module comprises a signal processing module.

14. The wind turbine according to claim 7, wherein the control module comprises a PID controller in which the vibrations in the blades is a process variable.

* * * * *